United States Patent
Wang et al.

(10) Patent No.: US 9,994,473 B2
(45) Date of Patent: Jun. 12, 2018

(54) RADIAL FLOW HYDROTHERMAL REACTOR FOR SLUDGE THERMAL HYDROLYSIS TREATMENT

(71) Applicant: XI'AN JIAOTONG UNIVERSITY, Xi'an, Shaanxi (CN)

(72) Inventors: Shuzhong Wang, Shaanxi (CN); Lili Qian, Shaanxi (CN); Xingying Tang, Shaanxi (CN); Panpan Sun, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 145 days.

(21) Appl. No.: 15/112,688

(22) PCT Filed: Nov. 10, 2014

(86) PCT No.: PCT/CN2014/090725
§ 371 (c)(1),
(2) Date: Jul. 20, 2016

(87) PCT Pub. No.: WO2015/149519
PCT Pub. Date: Oct. 8, 2015

(65) Prior Publication Data
US 2017/0008789 A1    Jan. 12, 2017

(30) Foreign Application Priority Data
Apr. 3, 2014 (CN) .......................... 2014 1 0133371

(51) Int. Cl.
*C02F 11/10* (2006.01)
(52) U.S. Cl.
CPC ........ *C02F 11/10* (2013.01); *C02F 2301/026* (2013.01); *Y02W 10/40* (2015.05)

(58) Field of Classification Search
CPC .. C02F 1/025; C02F 1/38; C02F 11/06; C02F 11/10; C02F 11/18; C02F 2101/03; C02F 2301/026; C02F 2303/06; F23G 7/001
See application file for complete search history.

(56) References Cited

U.S. PATENT DOCUMENTS

| | | | | |
|---|---|---|---|---|
| 2,538,412 A | * | 1/1951 | Cecil | C02F 11/18 126/360.2 |
| 3,649,534 A | * | 3/1972 | Schotte | C02F 11/18 210/761 |

(Continued)

FOREIGN PATENT DOCUMENTS

| CN | 201224692 | 4/2009 |
|---|---|---|
| CN | 202465468 | 10/2012 |

(Continued)

OTHER PUBLICATIONS

English language Machine translation of CN 202465470 U. Retrieved from translationportal.epo.org on Feb. 5, 2018. (Year: 2018).*

(Continued)

*Primary Examiner* — Jason M Greene

(57) ABSTRACT

A radial flow hydrothermal reactor for a sludge thermal hydrolysis treatment is provided. An outer and an inner cylinder are successively sleeved in a cylindrical body of the reactor. A guiding cylinder is arranged between the outer and the inner cylinder. Guiding pipes are provided on the guiding cylinder. An agitator is arranged in the inner cylinder, so that sludge has low viscosity and good fluidity after reaching reaction parameters. Because an inlet pipe is arranged below the inner cylinder, the sludge enters the inner cylinder from bottom and flows out from top, and the inner cylinder has a diameter not large, which guarantees heating time. Because of a small height-to-diameter ratio of the reactor, the sludge after heating has the good fluidity, and flows outward (Continued)

radially in the outer cylinder. With an increased flowing radius, a flowing velocity decreases, and a hydrothermal reaction proceeds continuously, which guarantees reaction time.

9 Claims, 2 Drawing Sheets

(56) References Cited

U.S. PATENT DOCUMENTS

| | | | | |
|---|---|---|---|---|
| 4,507,127 | A * | 3/1985 | Hirose | C02F 11/008 110/224 |
| 4,983,296 | A * | 1/1991 | McMahon | C02F 11/10 210/603 |
| 6,348,143 | B1 * | 2/2002 | Serikawa | C02F 1/02 204/242 |
| 6,475,396 | B1 * | 11/2002 | Wofford, III | C02F 11/08 210/198.1 |
| 2007/0003459 | A1 * | 1/2007 | Stadlbauer | C10L 37/10 422/219 |
| 2009/0283397 | A1 * | 11/2009 | Kato | B09B 3/00 202/208 |
| 2015/0021278 | A1 * | 1/2015 | Hojsgaard | C02F 11/18 210/750 |
| 2015/0191384 | A1 * | 7/2015 | Pardo | C02F 11/04 210/603 |
| 2017/0211808 | A1 * | 7/2017 | Pardo | C02F 11/10 |

FOREIGN PATENT DOCUMENTS

| | | | | |
|---|---|---|---|---|
| CN | 202465470 | | 10/2012 | |
| CN | 202465470 U | * | 10/2012 | C02F 11/10 |
| CN | 203256107 U | * | 10/2013 | C02F 11/10 |
| JP | 2004136175 | | 5/2004 | |
| WO | 2009028519 | | 3/2009 | |

OTHER PUBLICATIONS

English language Machine translation of CN 203256107 U. Retrieved from translationportal.epo.org on Feb. 5, 2018. (Year: 2018).*

* cited by examiner

RADIAL FLOW HYDROTHERMAL REACTOR FOR SLUDGE THERMAL HYDROLYSIS TREATMENT

CROSS REFERENCE OF RELATED APPLICATION

This is a U.S. National Stage under 35 U.S.C 371 of the International Application PCT/CN2014/090725, filed Nov. 10, 2014, which claims priority under 35 U.S.C. 119(a-d) to CN 201410133371.7, filed Apr. 3, 2014.

BACKGROUND OF THE PRESENT INVENTION

Field of Invention

The present invention relates to a field of sludge reduction treatment, and more particularly to a radial flow hydrothermal reactor for a sludge thermal hydrolysis treatment.

Description of Related Arts

The municipal sludge is the by-product of the municipal sewage treatment, and a general name for the small amount of sediment, particles, and floats, generated by treating the municipal sewage with the conventional method. The municipal sludge has the following characteristics.

(1) High Production and Low Harmless Treatment Rate

The annual production of the sludge is 28 million tons (water content of 80%, in 2011), and three quarters of the sludge is not effectively treated.

(2) High Water Content and Dewatering Difficulty

The conventional mechanical dewatering method for the sludge merely reduces the water content of the sludge to about 80%.

(3) Harmfulness and Usefulness

Various organic pollutants and heavy metals exist in the municipal sludge and are harmful to the environment if being directly discharged. However, the municipal sludge has the high calorific value (7500-15000 kJ/kg dry sludge) which can be utilized as resources.

Currently, the most common sludge treatment methods are composting, landfill, and incineration, but the three methods have the requirements on the water content of the sludge. For example, the sludge landfill requires the water content of the sludge to be lower than 60%; for the sludge composting, it is required to add the bulking agent to adjust the water content to about 50%; and, for the sludge incineration, it is required to reduce the water content of the sludge to about 30%. Thus, it is necessary to further dewater the wet sludge having the water content of about 80%.

It is feasible to further dewater the sludge through the thermal drying method. The thermal drying method is able to reduce the water content of the sludge to lower than 50%, with a good reduction effect and stable product. However, the thermal drying method has the problems of the high technical requirements, the relatively complex management, the high energy consumption, and the relatively high treatment cost. In order to evaporate a ton of water, the sludge thermal drying method consumes 887025 kcal calories, namely 107 $m^3$ of natural gas which has the calorific value of 8300 $kcal/m^3$. For example, in order to reduce the water content of the wet sludge from 80% to 10% through the thermal drying method, each ton of the dry sludge consumes about 428 $m^3$ of natural gas and 300 kW·h electricity. The drying cost of each ton of the dry sludge reaches 1144.9 yuan (without considering the personnel salary and the device depreciation). It is easy to establish the thermal drying device, while it is too expensive to use. Thus, it is urgent to provide an economical method to replace the conventional thermal drying method.

The sludge hydrothermal treatment technology is to heat the sludge, and hydrolyze the viscous organics in the sludge at a certain temperature and pressure, so as to destroy the colloidal structure of the sludge and improve the dewaterability and the anaerobic digestion performance. The hydrothermal treatment technology is also called the thermal conditioning. According to whether the oxidizing agent is added during the hydrothermal treatment, the hydrothermal treatment technology is divided into the thermal hydrolysis and the wet oxidation. For the thermal hydrolysis, the oxidizing agent is unnecessary; for the wet oxidation, it is necessary to introduce the oxidizing agent into the reactor.

The sludge thermal hydrolysis technology is able to further reduce the water content of the sludge, high-effectively and economically. During heating the sludge, the microbial flocs in the sludge are dispersed; the microbial cells are broken; and the organics in the sludge are hydrolyzed, causing a decrease of the sludge viscosity and the water-holding capacity of the viscous materials to water. Moreover, when the sludge is heated to a certain temperature, the cells of the organics in the sludge are broken; the macromolecular organics in the cells are released and hydrolyzed; and the water bound with the various macromolecules in the cells is also released, causing an easier separation of the water from the sludge particles, which realizes the sludge dewatering and drying with the low energy-consumption and the high efficiency.

The hydrothermal reactor is the core device of the sludge thermal hydrolysis technology. However, the conventional hydrothermal reactor has the problems of the insufficient reaction, the poor continuity, the incompact structure and the large occupied area.

SUMMARY OF THE PRESENT INVENTION

An object of the present invention is to solve the problems in the prior arts, and to provide a radial flow hydrothermal reactor for a sludge thermal hydrolysis treatment. The radial flow hydrothermal reactor has a high thermal hydrolysis reaction efficiency and a good continuity, and is able to effectively reduce a water content of sludge after thermal hydrolysis, so as to meet a reduction requirement. Moreover, the radial flow hydrothermal reactor has functions of heating and reacting, as well as a compact structure.

In order to accomplish the above objects, the present invention adopts the following technical solutions.

A radial flow hydrothermal reactor for a sludge thermal hydrolysis treatment comprises: an agitator, a cylindrical body, an outer cylinder and an inner cylinder which are successively coaxially arranged in the cylindrical body, a guiding cylinder arranged between the outer cylinder and the inner cylinder, and guiding pipes provided at a lower part of a sidewall of the guiding cylinder; wherein:

a bottom part of the inner cylinder is connected with an inlet pipe; a discharging pipe is provided at a bottom part of the outer cylinder; an overflow groove is arranged between the cylindrical body and the outer cylinder; and an outlet pipe is provided at a bottom part of the overflow groove;

the agitator comprises: an electric motor, a vane, an agitating shaft, and a supporter located at a bottom part of the agitator; wherein: the electric motor is located at a top part of the cylindrical body; the agitating shaft has a first end connected with the electric motor, and a second end penetrating into the inlet pipe through the cylindrical body along a central axis; the agitating shaft is positioned by the supporter; the vane is arranged on the agitating shaft and located in the inner cylinder; and the inlet pipe comprises an inner pipe and an outer pipe, which are sleeved with each other coaxially; wherein: a scraper, which clings to a wall surface of the inner pipe, is arranged in the inner pipe; the scraper is fixedly connected with the agitating shaft; a steam pipe is arranged on a sidewall of the outer pipe, and inclines downward to connect with the outer pipe.

Preferably, the cylindrical body has a height-to-diameter ratio smaller than 1; the cylindrical body is made of stainless steel material or reinforced concrete; an upper part of the cylindrical body tapers gradually, and a sealing head for sealing is arranged at the upper part of the cylindrical body; and a bottom surface of a lower part of the cylindrical body has a 1°-2° inclination to a horizontal plane.

Preferably, the cylindrical body and the sealing head are welded together or connected through a flange.

Preferably, a plurality of holes, for introducing steam in the outer pipe into the inner pipe to be mixed with sludge, is evenly opened on the inner pipe.

Preferably, the agitator is a helical ribbon agitator, a helical ribbon screw agitator, or any other agitator which is able to push axially.

Preferably, a guiding cylinder head cover is arranged at an upper part of the guiding cylinder, for preventing the sludge from flowing out.

Preferably, the guiding pipes incline downward, and are circumferentially and evenly arranged along an outer wall of the guiding cylinder.

Preferably, a height of a position of the overflow groove where the overflow groove is connected with the outlet pipe is lower than a height of a symmetric position with respect to the agitating shaft as a symmetry axis; and the height from the position of the overflow groove where the overflow groove is connected with the outlet pipe to the symmetric position with respect to the agitating shaft as the symmetry axis gradually increases.

Preferably, a concave groove is arranged above the discharging pipe.

The present invention has the following advantages. Compared with prior arts, because the inlet pipe is arranged below the cylindrical body, the sludge flows into the inner cylinder from a lower part of the inner cylinder and flows out from an upper part of the inner cylinder; and the inner cylinder has a small diameter, which guarantees sufficient heating time. Because the cylindrical body has the small height-to-diameter ratio, after heating, the sludge having a relatively good fluidity stably flows out from the guiding pipes; the sludge in the outer cylinder flows outward radially; with an increase of a flowing radius, a flowing sectional area increases and a flowing velocity decreases, which guarantees sufficient reaction time within limited space of the reactor; and the reactor has the compact structure and the small occupied area. When the heating time and the reaction time are guaranteed, the reactor is able to work continuously; and the reactor has the compact structure.

The cylindrical body can be made of the stainless steel material or concrete material. The stainless steel material needs a simple processing, while the concrete material saves costs. Because the sealing head for sealing is arranged at the upper part of the cylindrical body, an internal pressure of the reactor is maintained. Because the upper part of the cylindrical body is sealed by the sealing head, it is feasible to weld the cylindrical body and the sealing head together or connect the cylindrical body with the sealing head through the flange, and thus it is convenient to seal up the radial flow hydrothermal reactor.

The scraper is arranged in the inner pipe of the inlet pipe; the scraper clings to the wall surface of the inner pipe, so as to maximally prevent the holes from being blocked by the sludge sticking on the wall surface of the inner pipe; the steam pipe inclines downward to connect with the outer pipe, in such a manner that, even though a small amount of the sludge flows into the outer pipe, the sludge is prevented from entering the steam pipe to block the steam pipe, which guarantees that the steam is able to effectively enter the inner pipe to heat the sludge.

The plurality of holes is evenly opened on the inner pipe, which enables the steam in the outer pipe to uniformly enter the inner pipe to be mixed with the sludge and increases a heating efficiency.

The agitator is a powerful agitator which is able to push axially; the agitator is able to powerfully agitate the sludge while transporting the sludge from bottom to top, in such a manner that the sludge flows out from the upper part of the inner cylinder after rapidly reaching reaction parameters.

The guiding cylinder head cover is arranged at the upper part of the guiding cylinder, and the guiding pipes incline downward, so as to prevent the sludge from directly flowing out from the upper part of the guiding cylinder after flowing out from the inner cylinder, to guarantee that the sludge flows into the outer cylinder from the guiding pipes of the guiding cylinder and slowly overflows into an upper part of the overflow groove during flowing radially.

A plurality of the guiding pipes is circumferentially and evenly arranged along the guiding cylinder, so that the sludge flows uniformly and radially into large space of the outer cylinder.

The height of the position of the overflow groove where the overflow groove is connected with the outlet pipe is lower than the height of the symmetric position with respect to the agitating shaft as the symmetry axis; and the height from the position of the overflow groove where the overflow groove is connected with the outlet pipe to the symmetric position with respect to the agitating shaft as the symmetry axis gradually increases, so that all overflowed sludge flows into the outlet pipe and then flows out from the outlet pipe.

The lower part of the cylindrical body has a certain inclination, and the concave groove is arranged above the discharging pipe, so as to guarantee that a discharging port is at a lowest point, for better collecting waste.

These and other objectives, features, and advantages of the present invention will become apparent from the following detailed description, the accompanying drawings, and the appended claims.

BRIEF DESCRIPTION OF THE DRAWINGS

The present invention is further illustrated with accompanying drawings.

In figures, 1: cylindrical body; 2: outer cylinder; 3: guiding cylinder; 4: inner cylinder; 5: agitator; 501: electric motor; 502: vane; 503: agitating shaft; 504: supporter; 6: guiding cylinder head cover; 7: sealing head; 8: overflow groove; 9: guiding pipes; 10: inlet pipe; 101: inner pipe; 102: outer pipe; 103: scraper; 104: steam pipe; 11: discharging pipe; and 12: outlet pipe.

DETAILED DESCRIPTION OF THE PREFERRED EMBODIMENT

Figure 1:
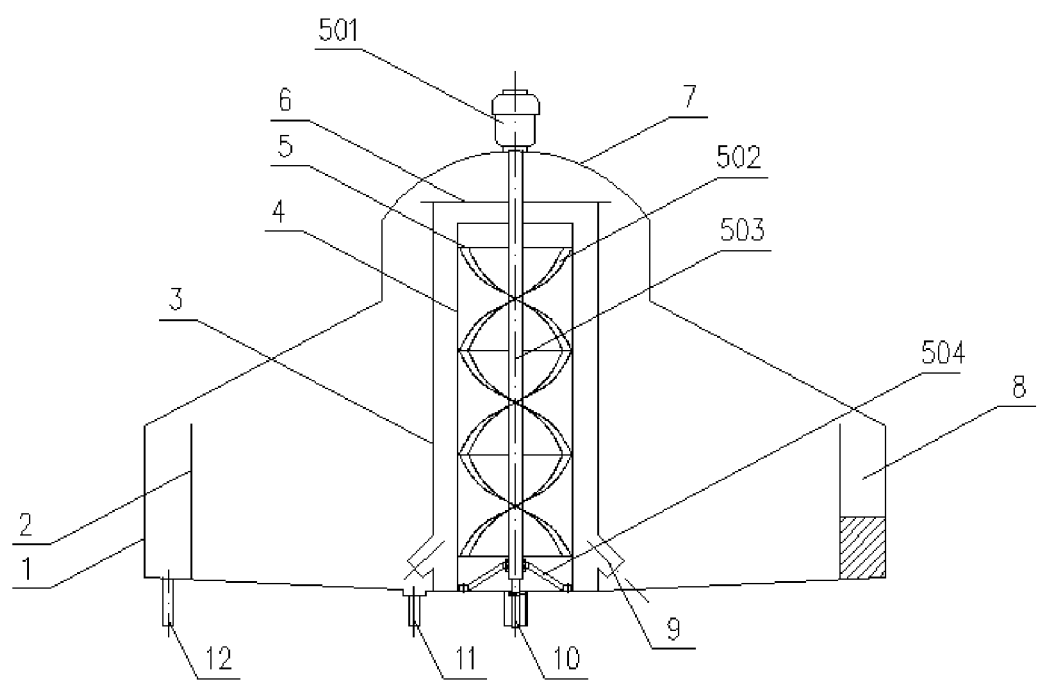
FIG. 1 is a structural sketch view of a radial flow hydrothermal reactor for a sludge thermal hydrolysis treatment according to a preferred embodiment of the present invention.
Figure 2:
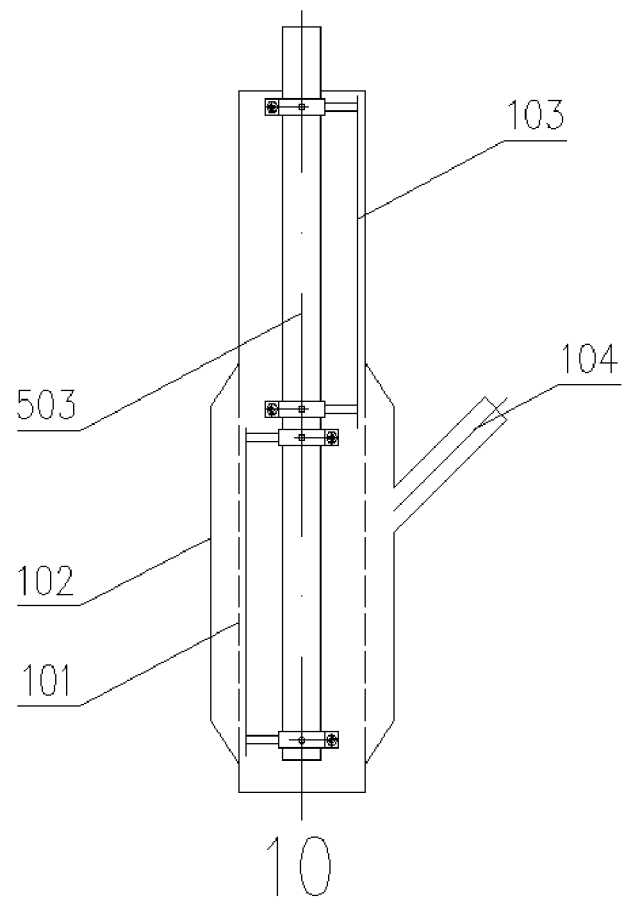
FIG. 2 is a structural sketch view of an inlet pipe of the radial flow hydrothermal reactor according to the preferred embodiment of the present invention.

Referring to FIG. 1 and FIG. 2, according to a preferred embodiment of the present invention, a radial flow hydrothermal reactor for a sludge thermal hydrolysis treatment comprises: an agitator 5; a cylindrical body 1 which has a height-to-diameter ratio smaller than 1 and is made of stainless steel material or reinforced concrete; an outer cylinder 2 and an inner cylinder 4 which are successively coaxially arranged in the cylindrical body 1; wherein:

a guiding cylinder 3 is arranged between the outer cylinder 2 and the inner cylinder 4; guiding pipes 9 are provided on a sidewall of the guiding cylinder 3; the guiding pipes 9 incline downward, and are circumferentially and evenly arranged along an outer wall of the guiding cylinder 3; and a guiding cylinder head cover 6 is arranged at an upper part of the guiding cylinder 3, so as to prevent sludge from flowing out;

an upper part of the cylindrical body 1 tapers gradually; a sealing head 7 is arranged at the upper part of the cylindrical body through welding or connecting through a flange; a bottom part of the inner cylinder 4 is connected with an inlet pipe 10; a discharging pipe 11 is provided at a bottom part of the outer cylinder 2; and a concave groove is arranged above the discharging pipe 11;

an overflow groove 8 is arranged between the cylindrical body 1 and the outer cylinder 2; and an outlet pipe 12 is provided at a bottom part of the overflow groove 8;

a height of a position of the overflow groove where the overflow groove 8 is connected with the outlet pipe 12 is lower than a height of a symmetric position with respect to an agitating shaft 503 as a symmetry axis; and the height from the position of the overflow groove where the overflow groove 8 is connected with the outlet pipe 12 to the symmetric position with respect to the agitating shaft 503 as the symmetry axis gradually increases; and the agitator 5 is a helical ribbon agitator, a helical ribbon screw agitator, or any other agitator which is able to push powerfully and axially.

Furthermore, the agitator 5 comprises: an electric motor 501, a vane 502, an agitating shaft 503, and a supporter 504 located at a bottom part of the agitator; wherein: the electric motor 501 is located at a top part of the cylindrical body 1; the agitating shaft 503 has a first end connected with the electric motor 501, and a second end penetrating into the inlet pipe 10 through the cylindrical body 1 along a central axis; the agitating shaft 503 is positioned by the supporter 504; the vane 502 is arranged on the agitating shaft 503 and located in the inner cylinder 4.

Furthermore, the inlet pipe 10 comprises an inner pipe 101 and an outer pipe 102 which are sleeved with each other coaxially; wherein: a scraper 103, which clings to a wall surface of the inner pipe, is arranged in the inner pipe 101; the scraper 103 is fixedly connected with the agitating shaft 503; a steam pipe 104 is arranged on a sidewall of the outer pipe 102 and inclines downward to connect with the outer pipe 102.

Furthermore, a plurality of holes, for introducing steam in the outer pipe into the inner pipe to be mixed with the sludge, is evenly opened on the inner pipe 101.

Working principles of the present invention are described as follows.

The sludge enters the inner cylinder 4 from the inner pipe 101. Then, the sludge is transported from bottom to top by the powerful agitator 5 having an axial force, while being continuously mixed with the steam. Because the sludge enters the inner cylinder 4 from a lower part of the inner cylinder 4 and flows out from an upper part of the inner cylinder 4, and the inner cylinder 4 has a relatively small diameter, heating time for the sludge is guaranteed. After heating to reaction conditions, the sludge overflows out from the inner cylinder 4 and enters the guiding cylinder 3. Because of the guiding cylinder head cover 6, the sludge is only able to flow into a gap between the guiding cylinder 3 and the inner cylinder 4, and then flow out from the guiding pipes 9. Because a plurality of the guiding pipes 9 is arranged circumferentially and evenly at a lower part of the guiding cylinder 3 and the guiding pipes 9 incline downward, the sludge after heating is merely able to uniformly enter the bottom part of the outer cylinder 2, which is a large empty space, along the guiding cylinder 3. Because of the small height-to-diameter ratio of the cylindrical body 1, and because of a destroyed colloidal structure, decreased viscosity, increased fluidity of the sludge after heating, the sludge flows around radially and stably. During flowing, a hydrothermal reaction of the sludge proceeds continuously. With an increase of a flowing radius, a flowing sectional area increases and a flowing velocity decreases, so that reaction time is guaranteed within limited space of the reactor. Thus, the radial flow hydrothermal reactor is able to work continuously, and has the compact structure and the small occupied area. During the hydrothermal reaction, cell walls are broken; water in cells is released; organics are hydrolyzed; the colloidal structure is further destroyed; and the viscosity of the sludge decreases. When the sludge in the outer cylinder 2 reaches a height of the overflow groove 8, the sludge starts to overflow. Then, the sludge is collected at a lowest point of an upper part of the outlet pipe 12 and flows out through the outlet pipe 12. After using the reactor for certain time, when it is necessary to discharge waste, a valve of the discharging pipe 11 is opened. Through an inclined plane of a bottom part of the cylindrical body 1, the waste is collected at the concave groove above the discharging pipe 11 and then flows out through the discharging pipe 11.

Working principles of the inlet pipe are described as follows.

The sludge enters the inner pipe 101 from a lower part of the inner pipe, and the steam enters the outer pipe 102 obliquely and downward from the steam pipe 104. The plurality of holes is evenly opened on the inner pipe 101, circumferentially and axially, which enables the steam in the outer pipe 102 to uniformly enter the inner pipe 101 to be mixed with the sludge. The scraper 103 is arranged in the inner pipe 101, and clings to the wall surface of the inner pipe 101, so as to prevent the holes from being blocked by the sludge sticking on the wall surface of the inner pipe 101. The steam pipe 104 inclines downward, in such a manner that, even though a small amount of the sludge flows into the outer pipe 102, the sludge is prevented from entering the steam pipe 104 to block the steam pipe 104.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A radial flow hydrothermal reactor for a sludge thermal hydrolysis treatment, comprising: an agitator (5), a cylindrical body (1), an outer cylinder (2) and an inner cylinder (4) which are successively coaxially arranged in said cylindrical body (1), a guiding cylinder (3) arranged between said outer cylinder (2) and said inner cylinder (4), and guiding pipes (9) provided at a lower part of a sidewall of said guiding cylinder (3); wherein:

a bottom part of said inner cylinder (4) is connected with an inlet pipe (10); a discharging pipe (11) is provided at a bottom part of said outer cylinder (2); an overflow groove (8) is arranged between said cylindrical body (1) and said outer cylinder (2); and an outlet pipe (12) is provided at a bottom part of said overflow groove (8);

said agitator (5) comprises: an electric motor (501), a vane (502), an agitating shaft (503), and a supporter (504) located at a bottom part of said agitator (5); wherein: said electric motor (501) is located at a top part of said cylindrical body (1); said agitating shaft (503) has a first end connected with said electric motor (501) and a second end penetrating into said inlet pipe (10) through said cylindrical body (1) along a central axis; said agitating shaft (503) is positioned by said supporter (504); said vane (502) is arranged on said agitating shaft (503) and located in said inner cylinder (4); and said inlet pipe (10) comprises an inner pipe (101) and an outer pipe (102), which are sleeved with each other coaxially; wherein: a scraper (103), which clings to a wall surface of said inner pipe (101), is arranged in said inner pipe (101); said scraper (103) is fixedly connected with said agitating shaft (503); a steam pipe (104) is arranged on a sidewall of said outer pipe (102) and inclines downward to connect with said outer pipe (102).

2. The radial flow hydrothermal reactor for the sludge thermal hydrolysis treatment, as recited in claim 1, wherein: said cylindrical body (1) has a height-to-diameter ratio smaller than 1, and is made of stainless steel material or reinforced concrete; an upper part of said cylindrical body (1) tapers gradually, and a sealing head (7) for sealing is arranged at said upper part of said cylindrical body (1); and a bottom surface of a lower part of said cylindrical body (1) has a 1°-2° inclination to a horizontal plane.

3. The radial flow hydrothermal reactor for the sludge thermal hydrolysis treatment, as recited in claim 2, wherein said cylindrical body (1) and said sealing head (7) are welded together or connected through a flange.

4. The radial flow hydrothermal reactor for the sludge thermal hydrolysis treatment, as recited in claim 1, wherein: a plurality of holes, for introducing steam in said outer pipe (102) into said inner pipe (101) to be mixed with sludge, is evenly opened on said inner pipe (101).

5. The radial flow hydrothermal reactor for the sludge thermal hydrolysis treatment, as recited in claim 1, wherein said agitator (5) is a helical ribbon agitator, a helical ribbon screw agitator, or any other agitator for pushing axially.

6. The radial flow hydrothermal reactor for the sludge thermal hydrolysis treatment, as recited in claim 1, wherein a guiding cylinder head cover (6) is arranged at an upper part of said guiding cylinder (3), for preventing sludge from flowing out.

7. The radial flow hydrothermal reactor for the sludge thermal hydrolysis treatment, as recited in claim 1, wherein said guiding pipes (9) incline downward, and are evenly and circumferentially arranged along an outer wall of said guiding cylinder (3).

8. The radial flow hydrothermal reactor for the sludge thermal hydrolysis treatment, as recited in claim 1, wherein: a height of a position of said overflow groove (8) where said overflow groove (8) is connected with said outlet pipe (12) is lower than a height of a symmetric position with respect to said agitating shaft (503) as a symmetry axis; and said height from said position of said overflow groove (8) where said overflow groove (8) is connected with said outlet pipe (12) to said symmetric position with respect to said agitating shaft (503) as said symmetry axis gradually increases.

9. The radial flow hydrothermal reactor for the sludge thermal hydrolysis treatment, as recited in claim 1, wherein a concave groove is arranged above said discharging pipe (11).

* * * * *